United States Patent
Liu

(10) Patent No.: US 11,886,251 B2
(45) Date of Patent: Jan. 30, 2024

(54) ELECTRONIC DEVICE

(71) Applicant: Lenovo (Beijing) Limited, Beijing (CN)

(72) Inventor: Jia Liu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/691,031

(22) Filed: Mar. 9, 2022

(65) Prior Publication Data
US 2023/0097587 A1 Mar. 30, 2023

(30) Foreign Application Priority Data
Sep. 27, 2021 (CN) .......................... 202111137324.6

(51) Int. Cl.
G06F 1/16 (2006.01)

(52) U.S. Cl.
CPC .......... *G06F 1/1652* (2013.01); *G06F 1/1681* (2013.01)

(58) Field of Classification Search
CPC ............................. G06F 1/1652; G06F 1/1681
See application file for complete search history.

(56) References Cited

U.S. PATENT DOCUMENTS

| | | | | |
|---|---|---|---|---|
| 7,196,692 B2* | 3/2007 | Mochizuki | ............ | G06F 1/1601 345/905 |
| 7,440,265 B2* | 10/2008 | Ou Yang | ............... | G06F 1/1652 455/575.4 |
| 7,446,757 B2* | 11/2008 | Mochizuki | ............ | G06F 1/1641 345/905 |
| 7,952,866 B2* | 5/2011 | Lee | ........................ | G06F 1/1654 361/679.04 |
| 10,321,583 B2* | 6/2019 | Seo | ......................... | H04N 5/64 |
| 10,817,020 B1* | 10/2020 | DeMaio | ................ | G06F 3/1423 |
| 11,442,506 B1* | 9/2022 | Hsu | ........................ | G06F 1/1654 |
| 11,556,151 B2* | 1/2023 | Rose | ...................... | G06F 1/1647 |
| 2004/0052044 A1* | 3/2004 | Mochizuki | ............ | G06F 1/1616 361/679.09 |
| 2022/0019263 A1* | 1/2022 | Sun | ....................... | H05K 5/0217 |
| 2022/0039273 A1* | 2/2022 | Zhang | ................. | H04M 1/0237 |

* cited by examiner

*Primary Examiner* — Rockshana D Chowdhury
(74) *Attorney, Agent, or Firm* — ANOVA LAW GROUP, PLLC

(57) ABSTRACT

An electronic device includes a first body, a second body rotatably connected to the first body, and a flexible body. The flexible body includes a fixed part fixed to a surface of the first body, and a movable part disposed at the first body and capable of moving to protrude from at least one side of the first body or be accommodated at the first body.

12 Claims, 10 Drawing Sheets

ELECTRONIC DEVICE

CROSS-REFERENCE TO RELATED APPLICATION

This application claims priority to Chinese Patent Application No. 202111137324.6, filed on Sep. 27, 2021, the entire content of which is incorporated herein by reference.

TECHNICAL FIELD

The present disclosure relates to the technical field of electronics technologies and, more particularly, to an electronic device.

BACKGROUND

Electronic devices are widely used by people. An electronic device often includes a flexible surface. Changing an area size of the flexible surface and enriching user operation modes are currently problems that need to be solved.

SUMMARY

One aspect of the present disclosure provides an electronic device. The electronic device includes a first body, a second body rotatably connected to the first body, and a flexible body. The flexible body includes a fixed part fixed to a surface of the first body, and a movable part disposed at the first body and capable of moving to protrude from at least one side of the first body or be accommodated at the first body.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

Figure 1:
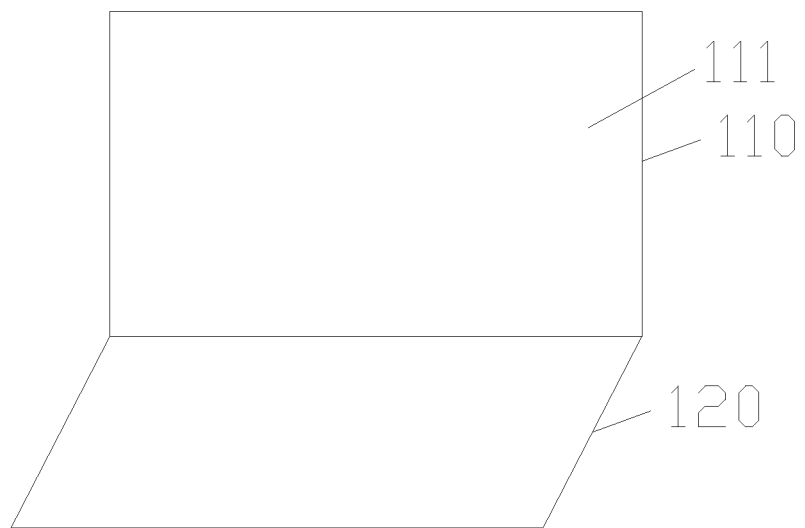
FIG. 1 is a schematic structural diagram of an exemplary electronic device according to some embodiments of the present disclosure.

Reference numerals: 110 first body, 111 first surface, 112 second surface, 113 guide slot, 120 second body, 130 first flexible body, 131 fixed part, 132 first movable part, 133 second movable part, 134 third movable part, 141 first support member, 1411 first guide end, 1412 support end, 1413 first connection member, 1414 second guide end, 1415 second connection member, 142 second support member, 143 first tooth part, 151 first plate part, 152 second tooth part, 153 adhesive glue, 160 elastic member, 170 driver mechanism, 181 transmission rod, 182 guide rod, 183 transmission block, 184 first connector, and 185 second connector.

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

In the description of the embodiments of the present disclosure, it should be noted that, unless otherwise stated and limited, the term "connection" should be understood in a broad sense. For example, it may be an electrical connection or an internal connection between two components. It may be a direct connection or an indirect connection through an intermediate structure. For those of ordinary skill in the art, specific meanings of the above term can be understood according to specific situations.

It should be noted that the terms "first\second\third" in the description of the embodiments of the present disclosure are only intended to distinguish similar objects, and do not represent a specific ordering of objects. It is understood that the terms "first\second\third" may interchangeably take a specific order or sequence where permitted. It should be understood that the "first\second\third" may be re-arranged under appropriate circumstances such that the embodiments of the present disclosure described herein may be practiced in sequences other than those illustrated or described herein.

The electronic devices according to the embodiments of the present disclosure will be described in detail below with reference to FIGS. 1 to 22.

The electronic device includes a first body 110, a second body 120, and a first flexible body 130. The second body 120 is rotatably connected to the first body 110. The first flexible body 130 includes a fixed part 131 and a movable part. The fixed part 131 is fixed at a first surface 111 of the first body 110. The movable part is configured on the first body 110. The movable part may move to protrude from at least one side of the first body 110. The movable part may be moved to be accommodated in the first body 110. When the movable part is moved to protrude from the at least one side of the first body 110 and to be accommodated in the first body 110, an area of the first flexible body 130 may be changed such that the area of the first flexible body 130 can be adjusted according to actual needs, thereby greatly improving adaptability of the electronic device.

The present disclosure does not limit a structure of the electronic device. For example, the electronic device may be a mobile phone, a game console, or a notebook computer.

Figure 2:
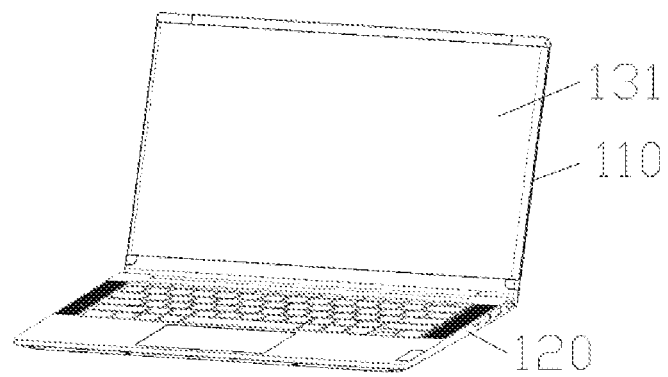
FIG. 2 is a schematic structural diagram of another exemplary electronic device according to some embodiments of the present disclosure.

The present disclosure does not limit a structure of the first body 110. For example, the first body 110 may be a rectangular-shaped structure. For example, the first body 110 may be a display screen of the notebook computer, as shown in FIG. 2.

The present disclosure does not limit a structure of the second body 120. For example, the second body 120 may be a rectangular-shaped structure. For example, the second body 120 may be a keyboard of the notebook computer, as shown in FIG. 2.

The present disclosure does not limit an implementation manner of a rotatable connection between the first body 110 and the second body 120. For example, the first body 110 and the second body 120 may be rotatably connected through a rotatable shaft.

The present disclosure does not limit a structure of the first flexible body 130. For example, the first flexible body 130 may be a flexible display screen. The fixed part 131 is fixed at the first surface 111 of the first body 110. The fixed part 131 is exposed with an exposed area that does not change.

Figure 4:
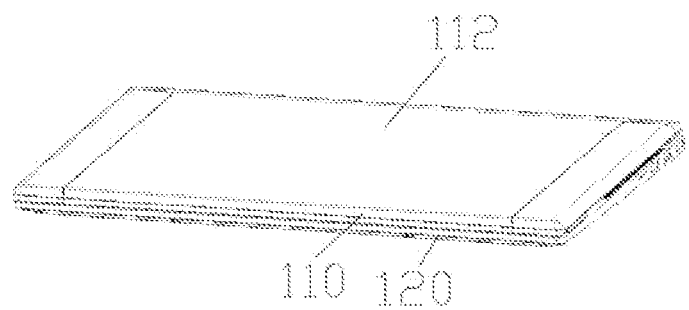
FIG. 4 is a schematic structural diagram of another exemplary electronic device according to some embodiments of the present disclosure.

The present disclosure does not limit a position of the first surface 111. For example, as shown in FIG. 1 and FIG. 4, the first surface 111 of the first body 110 may be a surface on which the first body 110 can be rotated to fit with the second body 120.

In some embodiments, a direction in which the movable part is disposed on the first body 110 is not limited as long as the movable part can move to protrude from the at least one side of the first body 110 and can move to be accommodated in the first body 110.

In some embodiments, the movable part and the fixed part 131 may be an integral structure. The movable part and the fixed part 131 may be different parts of a same flexible body. In some other embodiments, the movable part and the fixed part 131 may not be an integral structure. The movable part and the fixed part 131 may be different flexible bodies.

In some embodiments, the movable part may move from one side of the first body 110 to protrude from the first body 110, protrude from two sides of the first body 110, or protrude from three sides of the first body 110.

In some embodiments, a movement of the movable part to be accommodated in the first body 110 may be a movement of the movable part to be accommodated inside the first body 110 or may be a movement of the movable part to be accommodated on a surface of the first body 110. For example, the movable part can move to protrude from the first body 110 and satisfy a coplanar condition with the fixed part 131. The movable part can move to be accommodated on a second surface 112 of the first body 110. The second surface 112 and the first surface 111 are disposed opposite to each other.

Figure 3:
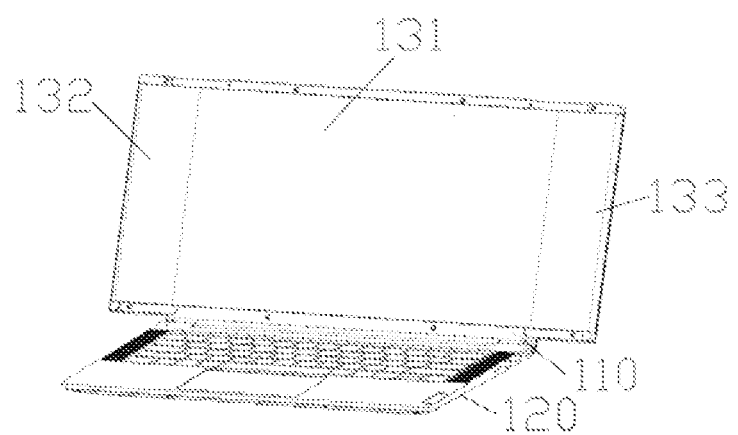
FIG. 3 is a schematic structural diagram of another exemplary electronic device according to some embodiments of the present disclosure.

In some embodiments, as shown in FIG. 3, the movable part includes: a first movable part 132 and a second movable part 133. The first movable part 132 is connected to the fixed part 131. The first movable part 132 can move to a first side of the first body 110 to satisfy the coplanar condition with the fixed part 131. The first movable part 132 can move to the second surface of the first body 110. The second surface 112 and the first surface 111 are disposed opposite to each other. The second movable part 133 is also connected to the fixed part 131. The second movable part 133 can move to a second side of the first body 110 to satisfy the coplanar condition with the fixed part 131. The second movable part 133 can also move to the second surface to satisfy the coplanar condition with the first movable part 132. The second side of the first body 110 and the first side of the first body 110 are disposed opposite to each other. As such, the first flexible body 130 can be extended to two opposite sides of the first body 110 to increase the exposed area through the first movable part 132 and the second movable part 133.

In some embodiments, the first movable part 132, the second movable part 133, and the fixed part 131 are integrated into one structure.

In some embodiments, as shown in FIG. 2, the first side of the first body 110 is a left-adjacent side of a side where the first body 110 and the second body 120 are connected, and the second side of the first body 110 is a right-adjacent side of the side where the first body 110 and the second body 120 are connected.

In some embodiment, the coplanar condition refers to being coplanar or being approximately coplanar.

Figure 5:
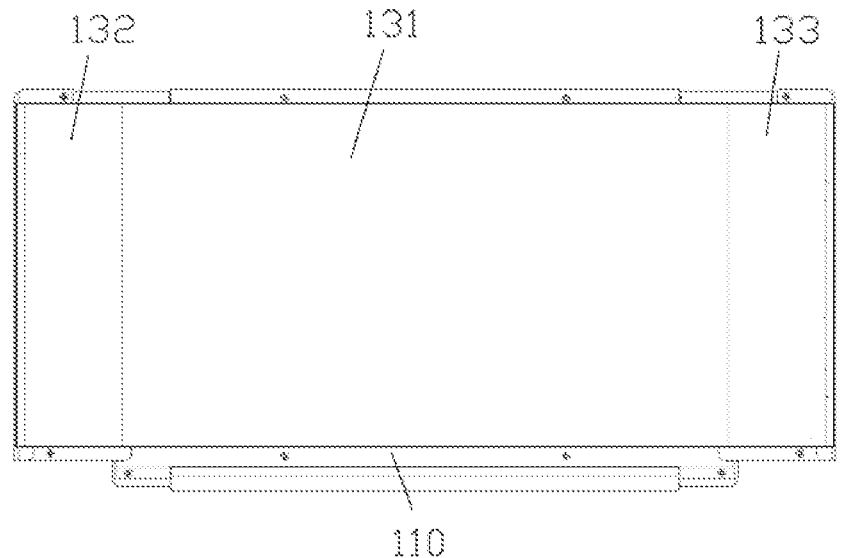
FIG. 5 is a partial schematic structural diagram of an exemplary electronic device according to some embodiments of the present disclosure.
Figure 6:
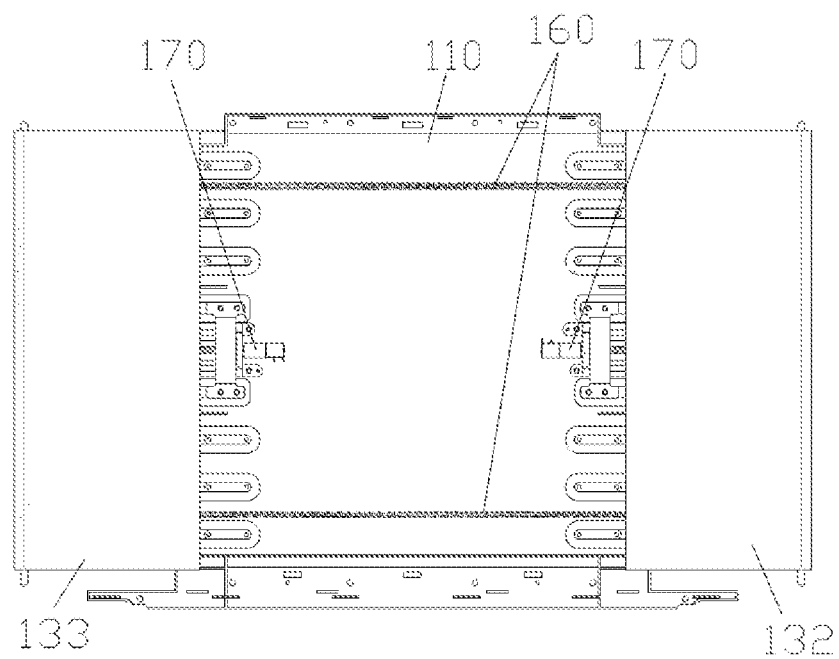
FIG. 6 is a partial schematic structural diagram of another exemplary electronic device according to some embodiments of the present disclosure.

In some embodiments, as shown in FIG. 3 and FIG. 5, under a circumstance that the first movable part 132 moves to the first side of the first body 110 to satisfy the coplanar condition with the fixe part 131, the first movable part 132 protrudes from the first side of the first body 110. As shown in FIG. 6, under the circumstance that the first movable part 132 moves to the second surface 112 of the first body 110, the first movable part 132 is accommodated on the second surface 112 of the first body 110. The second surface 112 is disposed opposite to the first surface 111. In some embodiments, the first movable par 132 may be entirely located on the second surface 112 of the first body 110 or may be partially located on the second surface 112 of the first body 110.

In some embodiments, as shown in FIG. 3 and FIG. 5, under the circumstance that the second movable part 133 moves to the second side of the first body 110 to satisfy the coplanar condition with the fixed part 131, the second movable part 132 protrudes from the second side of the first body 110. As shown in FIG. 6, under the circumstance that the second movable part 133 moves to the second surface 112 of the first body 110, the second movable part 132 is accommodated on the second surface 112 of the first body 110.

In some embodiments, the second movable part 133 and the first movable part 132 can contact each other on the second surface 112, such that the second movable part 133 and the first movable part 132 form a docking-style flexible body on the second surface 112. In some embodiments, the second movable part 133 and the first movable part 132 can be entirely accommodated on the second surface 112. In some other embodiments, the second movable part 133 and the first movable part 132 may be separated by a gap on the second surface 112, as shown in FIG. 6. In some embodiments, the second movable part 133 and the first movable part 132 may be partially accommodated on the second surface 112. The second movable part 133 and the first movable part 132 may partially satisfy the coplanar condition with the fixed part 131.

Figure 7:
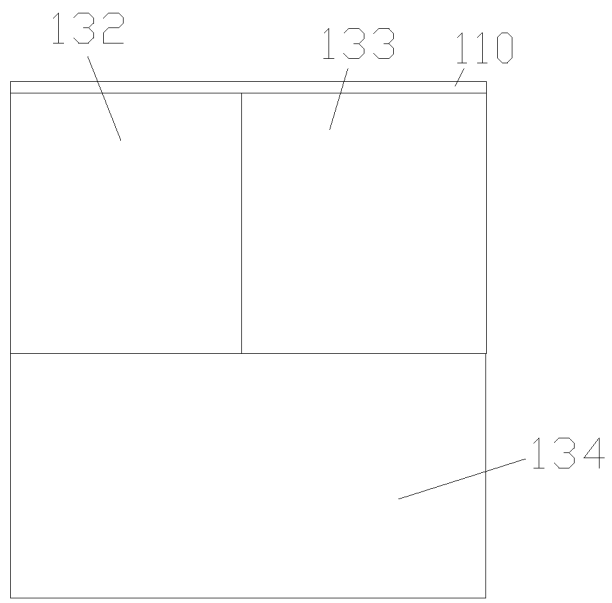
FIG. 7 is a schematic structural diagram of another exemplary electronic device according to some embodiments of the present disclosure.
Figure 8:
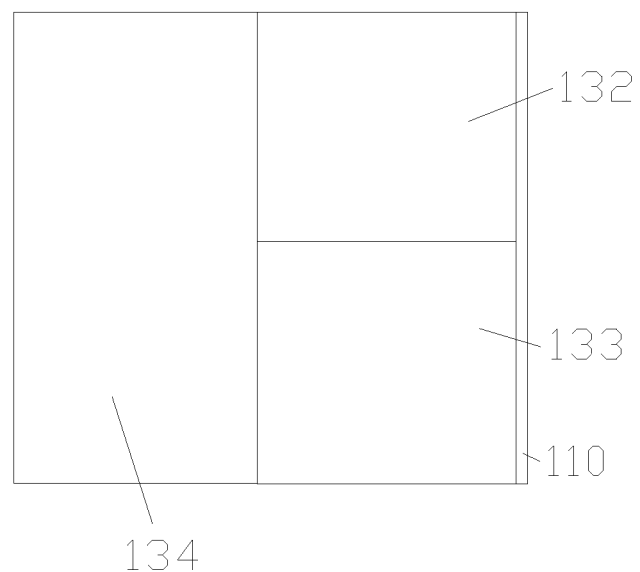
FIG. 8 is a schematic structural diagram of another exemplary electronic device according to some embodiments of the present disclosure.

In some embodiments, as shown in FIG. 7 and FIG. 8, the movable part may also include a third movable part 134. The third movable part 134 is disposed at the first body 110. The third movable part 134 can move to a third side of the first body 110 to protrude from the first body 110. The third side of the first body 110 is opposite to the side where the first body 110 and the second body 120 are connected. As such, the first flexible body 130 can extend to the third side of the first body 110 to increase the exposed area through the third movable part 134.

The third movable part 134 and the fixed part 131 may or may not be an integral structure.

In some embodiments, as shown in FIG. 7 and FIG. 8, in the circumstance that the second movable part 133 and the first movable part 132 move to contact each other at the second surface 112, the first body 110 and the second body 120 rotate relative to each other until the first surface 111 contacts the second body 120, and the third movable part 134 moves to protrude from the first body 110, the third movable part 134, the second movable part 133, and the first movable part 132 are configured to jointly display information, such that the third movable part 134, the second movable part 133, and the first movable part 132 can still display the information when the first body 110 and the second body 120 are in a closed state, which substantially expands operation modes of the electronic device. For example, the first body 110 and the second body 120 are in the closed state. When a user interacts with a certain application (e.g., video call) through the first movable part 132 and the second movable part 133 on the second surface 112, the user may also extend the third movable part 134 to process auxiliary information, such as displaying a shared file in an interaction process. The user may extend the third movable part 134 to process information for other applications, such as instant messaging, sending and receiving emails, etc. Thus, user's operation modes are enriched, and user's operation experience is improved.

In some embodiments, the third movable part 134, the second movable part 133, and the first movable part 132 may satisfy the coplanar condition. In this case, the third movable part 134 and the fixed part 131 are not one integral structure. In some other embodiments, the third movable part 134 and the fixed part 131 can be one integral structure. In this case, the third movable part 134 and the second movable part 133 do not satisfy the coplanar condition.

In some embodiments, the electronic device may only include one of the first movable part 132, the second movable part 133, and the third movable part 134, or may include two of the first movable part 132, the second movable part 133, and the third movable part 134.

In some embodiments, the electronic device further includes a second flexible body. The second flexible body is disposed at the second body 120. The second flexible body can move to attach to a third surface of the second body 120. The second flexible body can move to be accommodated inside the second body 120. In some embodiments, in the circumstance that the first body 110 and the second body 120 rotate relative to each other to an extended state, the second flexible body moves to attach to the third surface of the second body 120, and at least a portion of the movable part moves to protrude from the first body 110, the second flexible body, the fixed part 131, and the at least a portion of the movable part are configured to jointly display information. Thus, the exposed area of the flexible bodies is substantially increased, and the adaptability of the electronic device is improved.

The present disclosure does not limit a structure of the second flexible body. For example, the second flexible body may be a flexible display screen.

The present disclosure does not limit the implementation manner in which the second flexible body moves to attach to the third surface of the second body 120 and is accommodated inside the second body 120. For example, a rotating member is disposed inside a cavity of the second body 120. The second body 120 includes an opening. The second flexible body can be disposed circling outside the rotating member. The second flexible body can move through the opening to attach to the third surface of the second body 120. The second flexible body can also be accommodated inside the second body 120 through the opening.

In some other embodiments, the second flexible body may be fixedly disposed at the surface of the second body 120.

In some embodiments, the movement of the at least a portion of the movable part to protrude from the first body 110 may include the movement of at least one of the first movable part 132, the second movable part 133, or the third movable part 134 to protrude from the first body 110.

In some embodiments, the electronic device further includes a movable apparatus. The movable apparatus is disposed at the first body 110. The movable apparatus can move relative to the first body 110. The movable apparatus is configured to support the movable part. Thus, the movable part is supported by the movable apparatus to protrude from the first body 110.

The present disclosure does not limit a structure of the movable apparatus. For example, the movable apparatus may include a bracket. The bracket can move relative to the first body 110. The bracket is configured to support the movable part.

Figure 9:
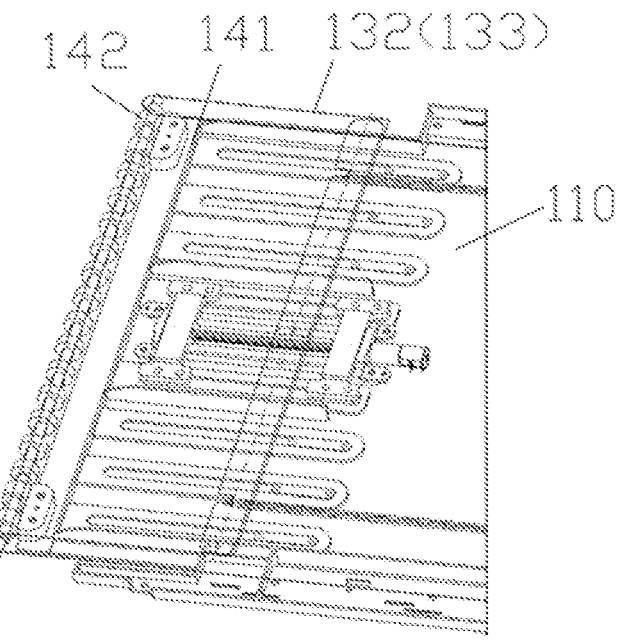
FIG. 9 is a partial schematic structural diagram of another exemplary electronic device according to some embodiments of the present disclosure.
Figure 10:
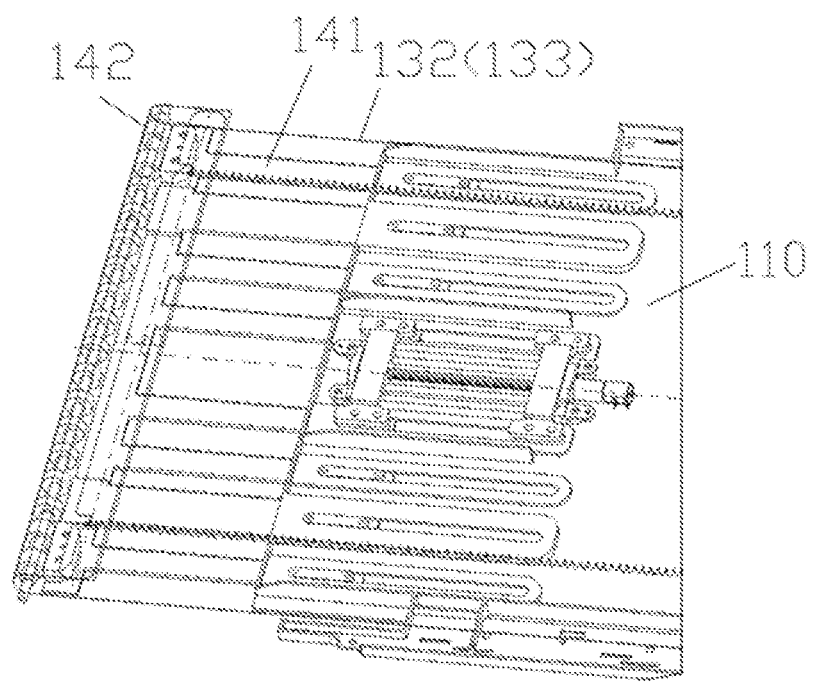
FIG. 10 is a partial schematic structural diagram of another exemplary electronic device according to some embodiments of the present disclosure.

In some embodiments, as shown in FIG. 9 and FIG. 10, the movable apparatus includes a first support member 141 and a second support member 142. The first support member 141 is disposed at the first body 110. The first support member 141 can move relative to the first body 110. The first support member 141 is configured to support the movable part. The second support member 142 is rotatably disposed at an end of the first support member 141. The second support member 142 is configured to support the movable part to locate at a peripheral portion of the first body 110. Under the circumstance that first support member 141 moves relative to the first body 110, the second support member 142 rotates relative to the first support member 141. A portion of the movable part moves between the first surface 111 and the second surface 112 of the first body 110 around the second support member 142. As such, the movable part can not only increase a display area of the flexible body on the first surface 111, but also be accommodated on the second surface 112. At the same time, the display area of the flexible body can be increased on the second surface 112 through accommodating the movable part on the second surface 112.

In some embodiments, as shown in FIG. 9 and FIG. 10, to better illustrate internal structures of the first support member 141 and the second support member 142, an internal structure of the movable part is made visible. However, it should not be construed that the movable part is a transparent structure. The movable part can be a nontransparent structure.

The present disclosure does not limit a structure of the first support member 141. For example, the first support member 141 can be a plate-shaped structure. In another example, the first support member 141 can be a frame-shaped structure.

In some embodiments, an implementation of the movement of the first support member 141 relative to the first body 110 is not limited by the present disclosure. For example, the first body 110 may include a sliding slot. A portion of the first support member 141 is clamped in the sliding slot.

The present disclosure does not limit a structure of the second support member 142. For example, the second support member 142 can be a cylinder-shaped structure, such that the movable part is supported by the cylindrical surface of the second support member 142.

In some embodiment, an implementation of the second support member 142 being rotatably disposed at an end of the first support member 141 is not limited by the present disclosure. For example, the second support member 142 may be rotatably disposed at the end of the first support member 141 through a rotation shaft.

In some embodiments, the movable part may directly contact the first support member 141 and the second support member 142 or may contact the first support member 141 and the second support member 142 through other intermediate structures.

For example, the movable apparatus further includes a flexible transmission member. The flexible transmission member is connected to the movable part. The flexible transmission member is in frictional contact with the second support member 142. Under the circumstance that the first support member 141 moves, the second support member 142 rotates. The flexible transmission member rotates with the rotation of the second support member 142. The flexible transmission member drives the movable part to move. As such, the movable part can be supported by the flexible transmission member to prevent the movable part from being damaged. At the same time, the second support member 142 and the movable part can move synchronously through the frictional contact of the flexible transmission member with the second support member 142.

Figure 11:
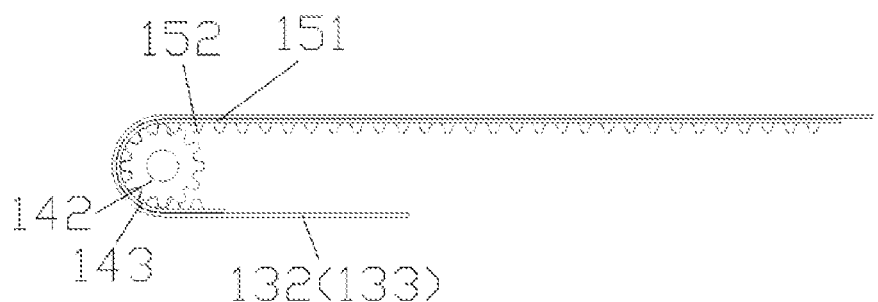
FIG. 11 is a partial schematic structural diagram of another exemplary electronic device according to some embodiments of the present disclosure.
Figure 12:
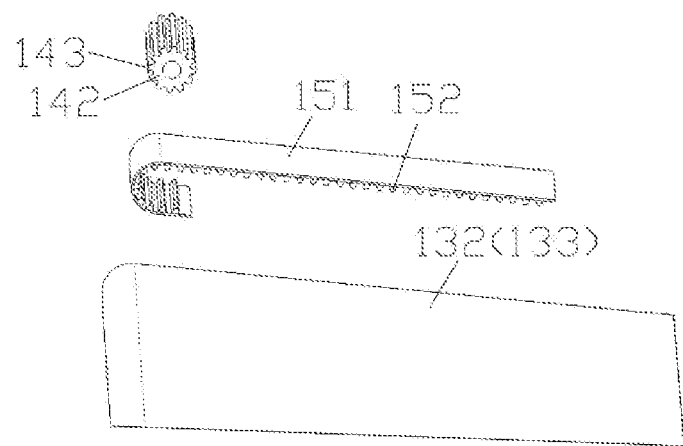
FIG. 12 is a partial schematic structural diagram of another exemplary electronic device according to some embodiments of the present disclosure.

The present disclosure does not limit a structure of the flexible transmission member. For example, the flexible transmission member may be a belt-shaped structure. The second support member 142 may be a pulley-shaped structure. In another example, the flexible transmission member may be the belt-shaped structure. The flexible transmission member includes a first concave-convex structure disposed at the surface thereof. The second support member 142 includes a second concave-convex structure disposed at the surface thereof. The first concave-convex structure and the second concave-convex structure frictionally contact each other. In another example, as shown in FIG. 11 and FIG. 12, the second support member 142 includes at least two first tooth parts 143. The flexible transmission member includes a first plate part 151 and at least two second tooth parts 152. The first plate part 151 is fixedly connected to the movable part. The at least two second tooth parts 152 are disposed at intervals on the first plate part 151. The at least two second tooth parts 152 are meshed with the at least two first tooth parts 143.

In some embodiments, the second support member 142 may be a gear structure.

Figure 13:
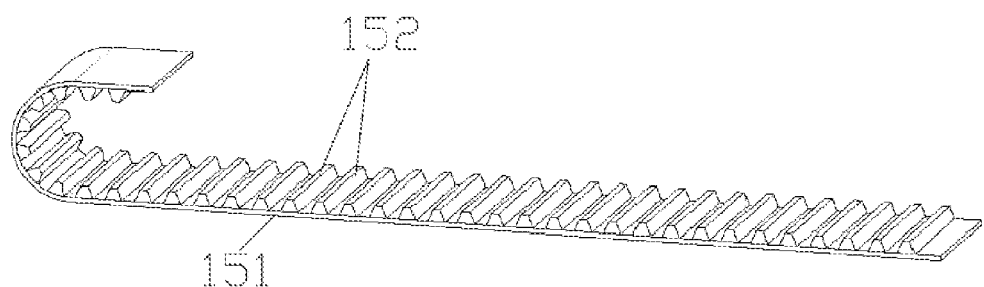
FIG. 13 is a schematic structural diagram of a flexible transmission member of an exemplary electronic device according to some embodiments of the present disclosure.
Figure 14:
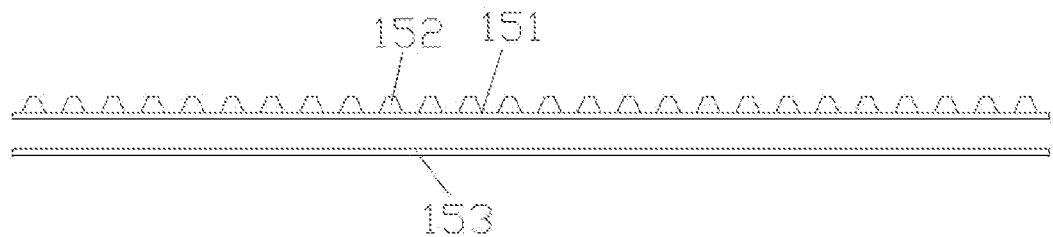
FIG. 14 is a partial schematic structural diagram of another exemplary electronic device according to some embodiments of the present disclosure.

In some embodiments, materials of the first plate part 151 and the second tooth parts 152 are not limited. Hardness of the first plate part 151 may be less than that of the second tooth part 152. For example, the first plate part 151 is a soft rubber structure, and the second tooth part 152 is a hard rubber structure, such that the softer first plate part 151 can deform. The harder second tooth part 152 can more stably mesh with the first tooth part 143, and the hard rubber structure of the second tooth part 152 can also reduce a friction force of meshing with the first tooth part 143, thereby improving transmission efficiency. The first plate part 151 and the second tooth part 152 may be formed into an integral structure by injection molding, as shown in FIG. 13. In some embodiments, the first plate part 151 may be connected to the movable part through an adhesive glue 153, as shown in FIG. 14.

Figure 15:
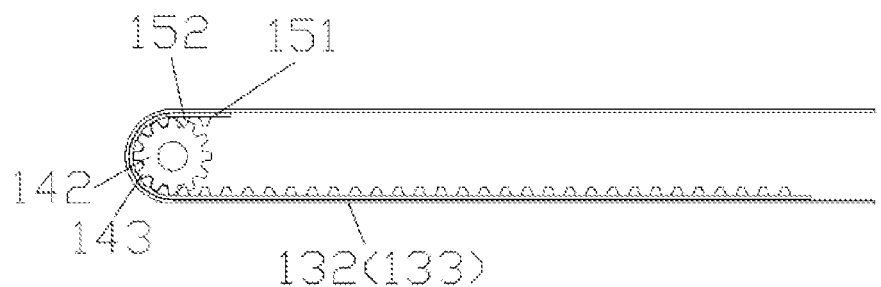
FIG. 15 is a partial schematic structural diagram of another exemplary electronic device according to some embodiments of the present disclosure.
Figure 16:
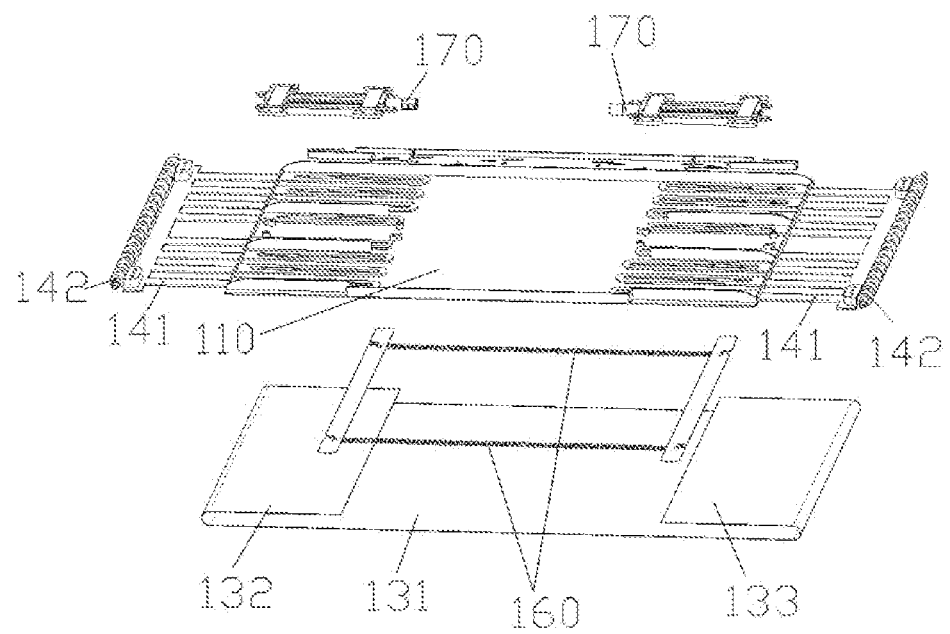
FIG. 16 is a partial exploded structural view of an exemplary electronic device according to some embodiments of the present disclosure.
Figure 17:
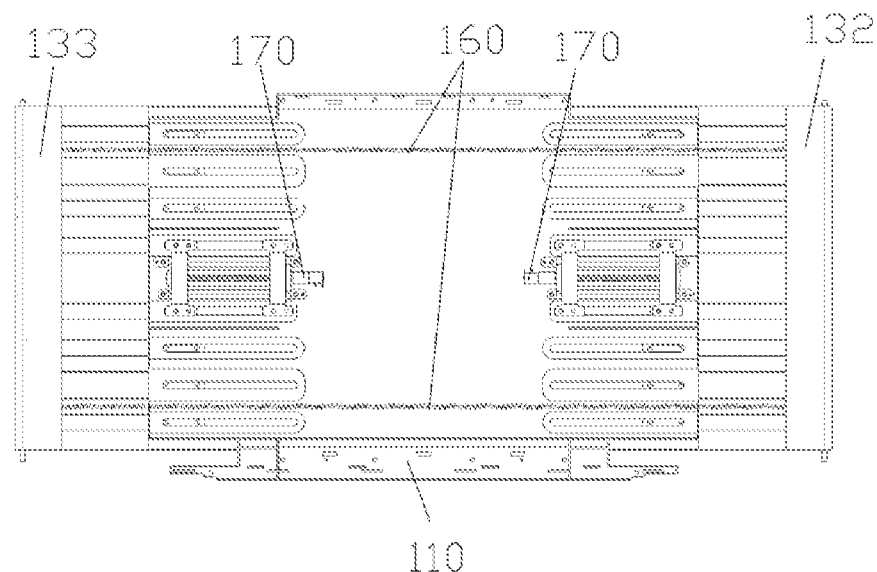
FIG. 17 is a partial schematic structural diagram of another exemplary electronic device according to some embodiments of the present disclosure.

It should be noted that the first movable part 132, the second movable part 133, and the third movable part 134 may be supported by a same structure or different structures. In some embodiments, as shown in FIG. 15, FIG. 16, and FIG. 17, the first movable part 132 and the second movable part 13 may be supported and moved by the first support member 141 and the second support member 142. The third movable part 134 may also be supported and moved by the first support member 141 and the second support member 142. In some other embodiments, the third movable part 134 may be supported and moved by other structures.

In some embodiments, the electronic device further includes a driver mechanism 170 and an elastic member 160. The driver mechanism 170 is connected to the first support member 141. The driver mechanism 170 is configured to drive the first support member 141 to drive the movable part to move in a first direction. The elastic member 160 is disposed at the first body 110. The elastic member 160 is connected to the movable part. The elastic member 160 is configured to drive the movable part to move in a second direction. The second direction is opposite to the first direction. The movable part is driven by the elastic member 160 to move, such that the movable part remains in the extended state during the movement, thereby preventing the movable part from wrinkling. Further, when the movable part moves from protruding from the first body 110 to being accommodated in the first body 110, the elastic member 160 can also provide a pulling force for the movable part, such that the movable part remains to be supported by the second support member 142, and the movable part and the second support member 142 are prevented from being separated from each other.

Figure 18:
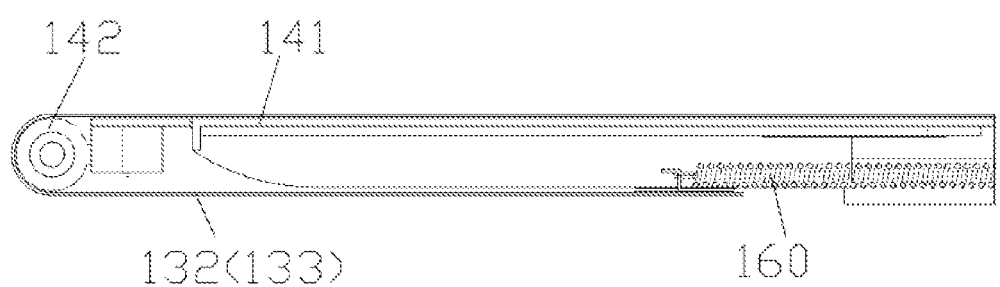
FIG. 18 is a partial schematic structural diagram of another exemplary electronic device according to some embodiments of the present disclosure.
Figure 19:
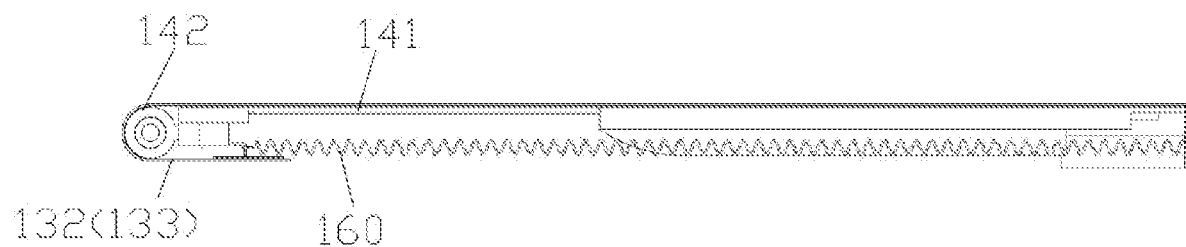
FIG. 19 is a partial schematic structural diagram of another exemplary electronic device according to some embodiments of the present disclosure.

The present disclosure does not limit a structure of the elastic member 160. For example, the elastic member 160 may be a spring, as shown in FIG. 18 and FIG. 19. A quantity of the elastic member 160 is not limited. In some embodiments, as shown in FIG. 16 and FIG. 17, the first movable part 132 and the second movable part 133 are connected to two elastic members 160.

The present disclosure does not limit a structure of the driver mechanism 170. For example, the driver mechanism 170 may be an electric motor. A quantity of the driver mechanisms is not limited. In some embodiments, as shown in FIG. 16 and FIG. 17, the first movable part 132 and the second movable part 133 are each provided with one driver mechanism 170.

The present disclosure does not limit a method of connecting the driver mechanism 170 with the first support member 141 as long as the driver mechanism 170 drives the first support member 141 to drive the movable part to move in the first direction.

Figure 20:
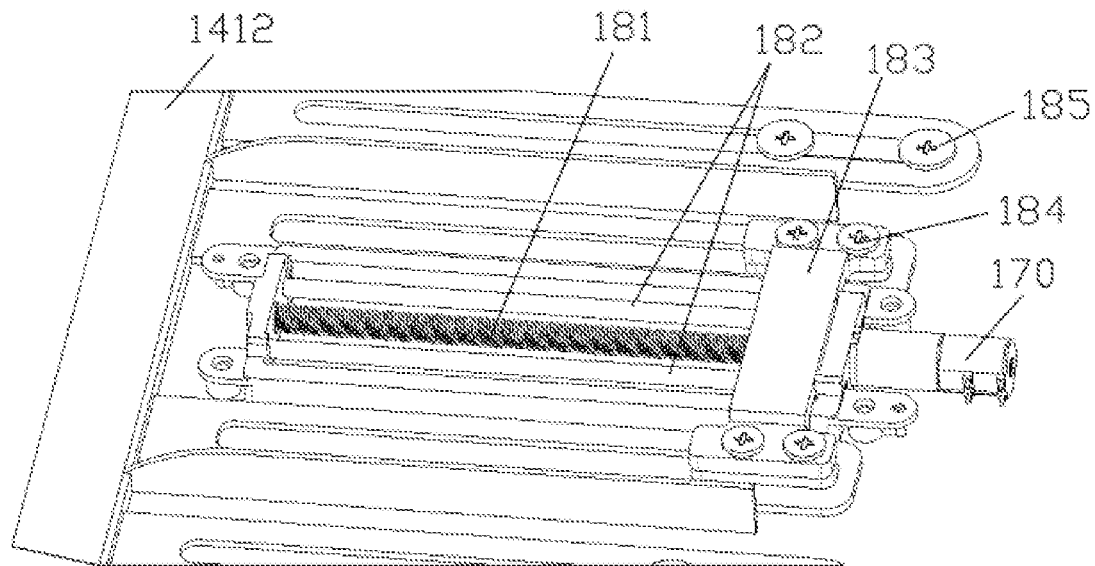
FIG. 20 is a partial schematic structural diagram of another exemplary electronic device according to some embodiments of the present disclosure.
Figure 21:
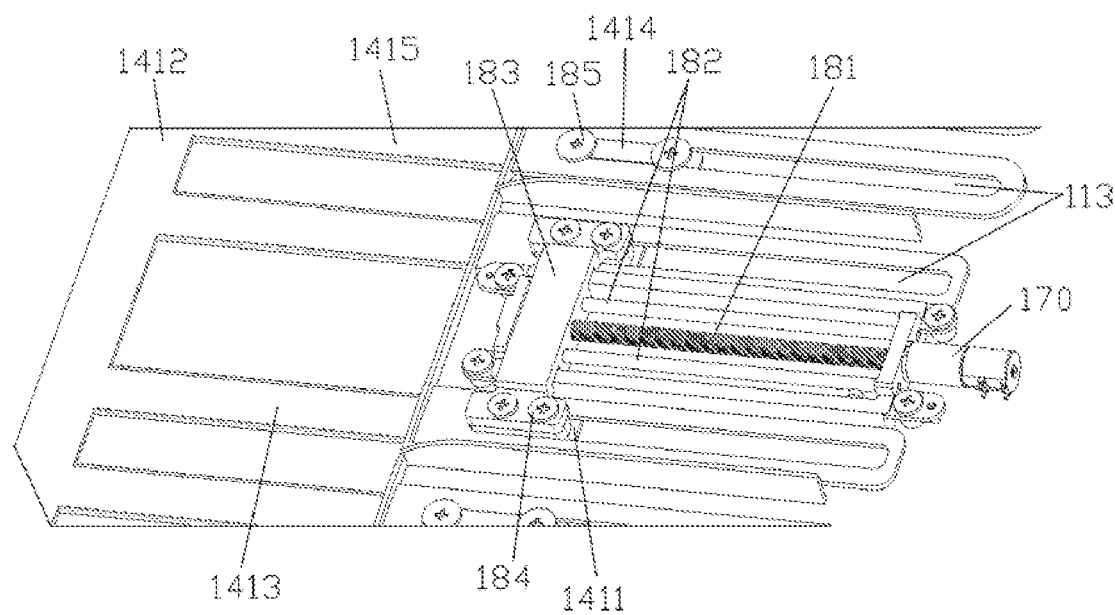
FIG. 21 is a partial schematic structural diagram of another exemplary electronic device according to some embodiments of the present disclosure.
Figure 22:
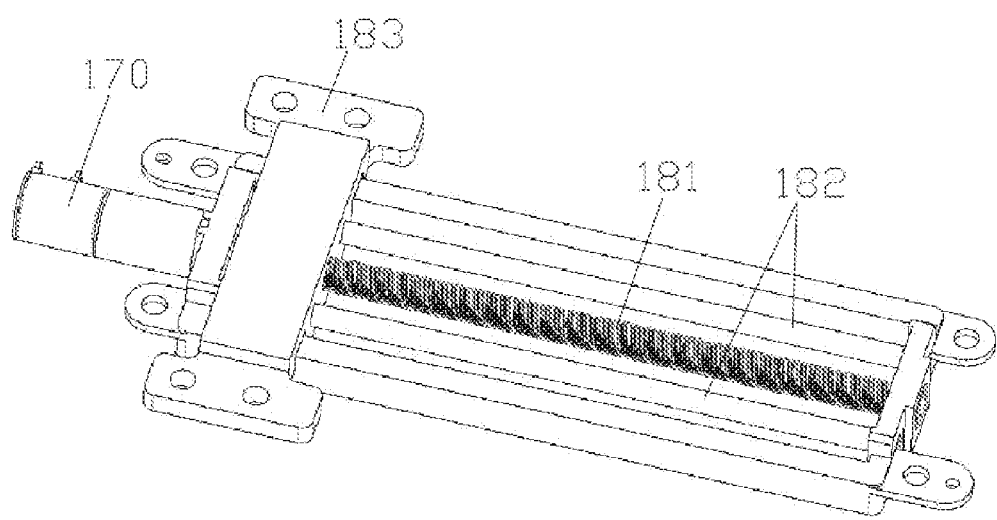
FIG. 22 is a partial schematic structural diagram of another exemplary electronic device according to some embodiments of the present disclosure.

For example, as shown in FIG. 21 and FIG. 22, the electronic device further includes a transmission rod 181, two guide rods 182, and a transmission block 183. The transmission rod 181 is connected to the driver mechanism 170. The driver mechanism 170 is configured to drive the transmission rod 181 to rotate. The two guide rods 182 are fixed to the first body 110. The two guide rods 182 are disposed at two sides of the transmission rod 181. The transmission block 183 surrounds the transmission rod 181. The transmission block 183 is threadedly connected to the transmission rod 181. The transmission block 183 also surrounds the two guide rods 182. As shown in FIG. 20 and FIG. 21, the first support member 141 may include two first guide ends 1411, a support end 1412, and two first connection members 1413. The two first guide ends 1411 are connected to two ends of the transmission block 183, respectively. The support end 1412 is rotatably connected to the second support member 142. The two first connection members 1413 are connected to the support end 1412. The two first connection members 1413 are connected to the two first guide ends 1411, respectively.

Under the circumstance that the driver mechanism 170 drives the transmission rod 181 to rotate, the transmission block 183 drives the two first guide ends 1411 to move along the transmission rod 181. The support end 1412 and the two first connection members 1413 move with the movement of the two first guide ends 1411. The two guide rods 182 located at the two sides of the transmission rod 181 provide a guide force for the transmission block 183, and the two guide rods 182 support the transmission block 183 at the two opposite sides of the transmission block 183 to ensure that two ends of transmission block 183 are subject to even forces during the movement. Thus, the transmission block 183 is ensured to move stably and smoothly along the transmission rod 181 for a long distance, the transmission block 183 is prevented from being stuck due to unilateral force, the power of the electric motor needs not to be increased to unstuck the transmission block 183 due to the unilateral force, and cost of ensuring the stable and smooth movement of the transmission block 183 can be substantially reduced.

The connection of the two first guide ends 1411 to the two ends of the transmission block 183 respectively refers to that one of the two first guide ends 1411 is connected to one end of the transmission block 183, and another of the two first guide ends 1411 is connected to another end of the transmission block 183.

The first body 110 also includes at least two guide slots 113. One first guide end 1411 and one end of the transmission block 183 are connected through a first connector 184. The first connector 184 can pass through the guide slots 113 to provide a guiding function for the movement of the first supporting member 141.

In some embodiments, as shown in FIG. 20 and FIG. 21, the first support member 141 also includes a second guide end 1414. The second guide end 1414 is connected to a second connector 185. The second connector 185 can pass through the guide slots 113. The second guide end 1414 is connected to the support end 1412 through a second connection member 1415. Thus, the second connector 185 passes through the guide slots 113 to provide a guiding function for the movement of the first supporting member 141.

The present disclosure does not limit structures of the first connector 184 and the second connector 185. For example, the first connector 184 and the second connector 185 may both be screws.

The present disclosure does not limit structures of the first connection member 1413 and the second connection member 1415. For example, the first connection member 1413 and the second connection member 1415 may both be a stripe-shaped structure.

In the embodiments of the present disclosure, the electronic device includes the first body 110, the second body 120 rotatably connected to the first body 110, and the first flexible body 130. The first flexible body 130 includes the fixed part 131 that is fixed to the first surface 111 of the first body 110, and the movable part disposed at the first body 110 and capable of moving to protrude from the at least one side of the first body 110 and being accommodated in the first body 110. Through moving the movable part to protrude from the at least one side of the first body 110 and to be accommodated in the first body 110, the exposed area of the first flexible body 130 can be changed, such that the exposed area of the first flexible body 130 can be adjusted as needed, and the adaptability of the electronic device is substantially improved.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

What is claimed is:

1. An electronic device comprising:
a first body;
a second body rotatably connected to the first body; and
a flexible body including:
a fixed part fixed to a first surface of the first body; and
a movable part disposed at the first body and capable of moving to protrude from at least one side of the first body or be accommodated at the first body, the movable part including:
a first movable part connected to the fixed part and capable of moving to a first side of the first body to satisfy a coplanar condition with the fixed part or moving to a second surface of the first body, the second surface being opposite to the first surface;
a second movable part connected to the fixed part and capable of moving to a second side of the first body to satisfy the coplanar condition with the fixed part or moving to the second surface of the first body to satisfy the coplanar condition with the first movable part and contact the first movable part, the second side being opposite to the first side; and a third movable part disposed at the first body and capable of moving to protrude from a third side of the first body, the third side being opposite to a side of the first body that is connected to the second body.

2. The electronic device according to claim 1, wherein the third movable part, the second movable part, and the first movable part are configured to jointly display information in a circumstance that the second movable part and the first movable part move to the second surface to contact each other, the first body and the second body rotate relative to each other until the first surface is in contact with the second body, and the third movable part moves to protrude from the first body.

3. The electronic device according to claim 1, wherein the flexible body is a first flexible body; the electronic device further comprising:

a second flexible body disposed at the second body and capable of moving to attach to a surface of the second body or moving to be accommodated in the second body.

4. The electronic device according to claim 3, wherein the second flexible body, the fixed part, and a portion of the movable part are configured to jointly display information in a circumstance that the first body and the second body rotate relative to each other to an extended state, the second flexible body moves to attach to the surface of the second body, and the portion of the movable part moves to protrude from the first body.

5. The electronic device according to claim 1, wherein the movable part is configured to move to protrude from the first body to satisfy a coplanar condition with the fixed part.

6. The electronic device according to claim 1, wherein:
the movable part is configured to move to be accommodated on the second surface of the first body.

7. The electronic device according to claim 1, further comprising:
a first support member disposed at the first body and supporting the movable part, the first support member being capable of moving relative to the first body; and
a second support member rotatably disposed at an end of the first support member and supporting the movable part to locate at a peripheral portion of the first body;

wherein:
in response to the first support member rotating relative to the first body, the second support member rotates relative to the first support member, and a portion of the movable part is wound around the second support member and moves between the first surface and the second surface of the first body.

8. The electronic device according to claim 7, further comprising:
a flexible transmission member connected to the movable part and in frictional contact with the second support member;
wherein in response to the first support member moving, the second support member rotates, and the flexible transmission member moves while the second support member rotates, to drive the movable part to move.

9. The electronic device according to claim 8, wherein:
the second support member includes at least two first tooth parts; and
the flexible transmission member includes:
a plate part fixedly connected to the movable part; and
at least two second tooth parts disposed at an interval on the first plate part to mesh with the at least two first tooth parts.

10. The electronic device according to claim 7, further comprising:
a driver mechanism connected to the first support member and configured to drive the first support member to drive the movable part to move in a first direction; and
an elastic member arranged at the first body and connected to the movable part, the elastic member being configured to drive the movable part to move in a second direction opposite to the first direction.

11. The electronic device according to claim 10, further comprising:
a transmission rod connected to the driver mechanism, the driver mechanism being configured to drive the transmission rod to rotate;
two guide rods fixed to the first body and disposed at two sides of the transmission rod; and
a transmission block surrounding the transmission rod and the two guide rods, and threadedly connected to the transmission rod.

12. The electronic device according to claim 11, wherein the first support member includes:
two guide ends connected to two ends of the transmission block, respectively;
a support end rotatably connected to the second support member; and
two connection members connected to the support end and connected to the two first guide ends, respectively.

* * * * *